March 12, 1940. V. F. DAVIS 2,192,963
COMPENSATED VALVE
Filed May 22, 1937 4 Sheets-Sheet 1
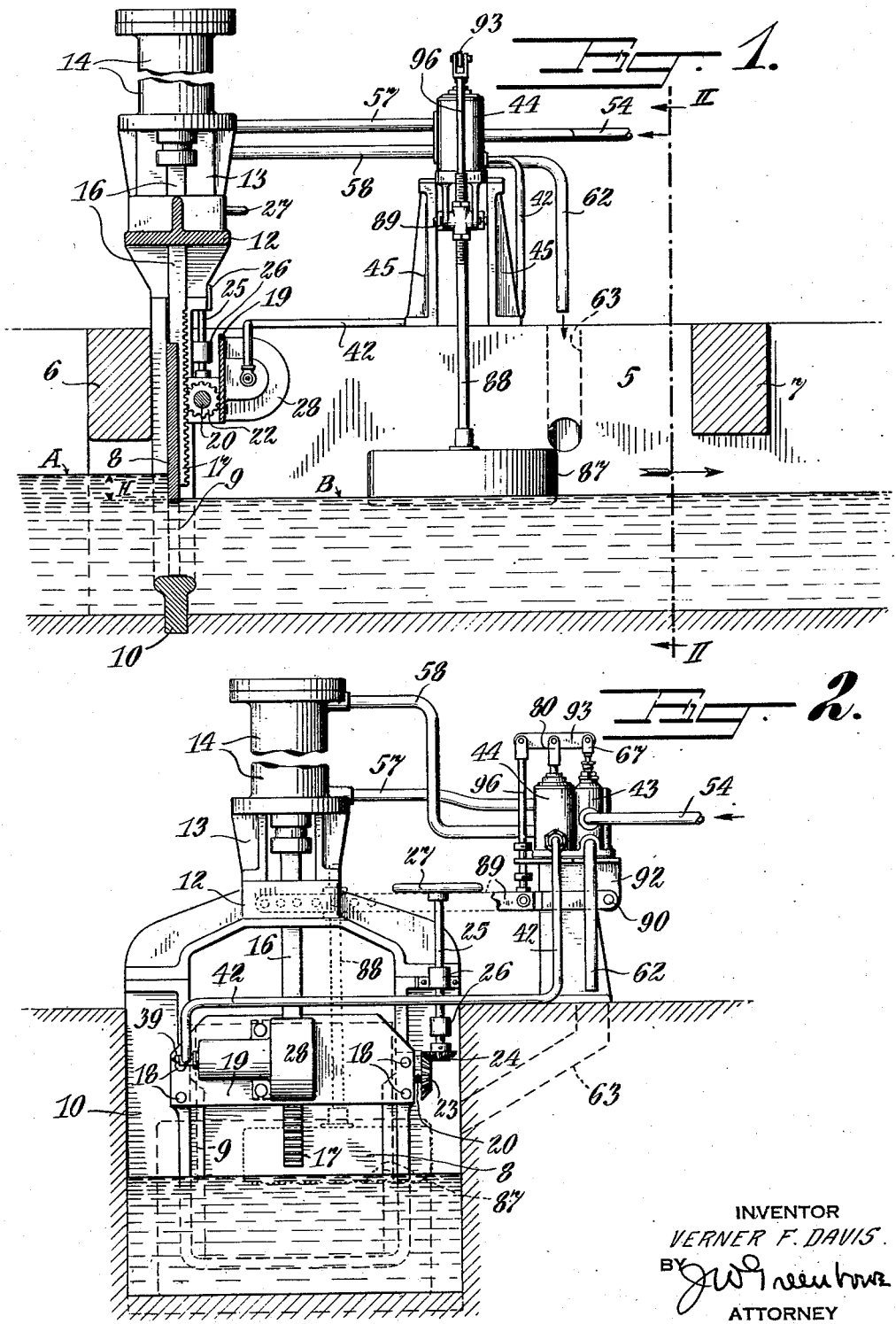
INVENTOR
VERNER F. DAVIS.
BY
ATTORNEY March 12, 1940.  V. F. DAVIS  2,192,963
COMPENSATED VALVE
Filed May 22, 1937  4 Sheets-Sheet 2
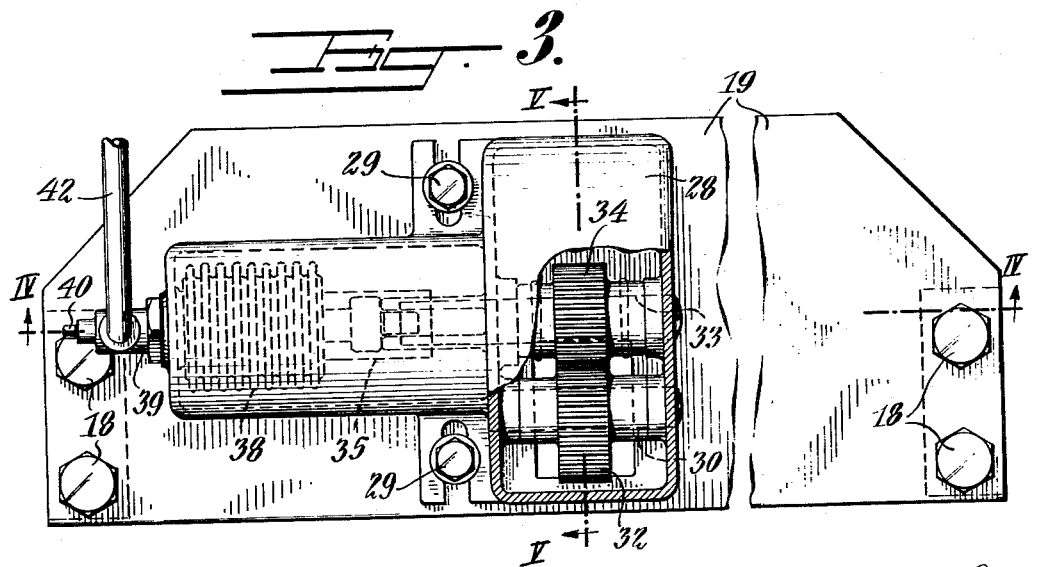
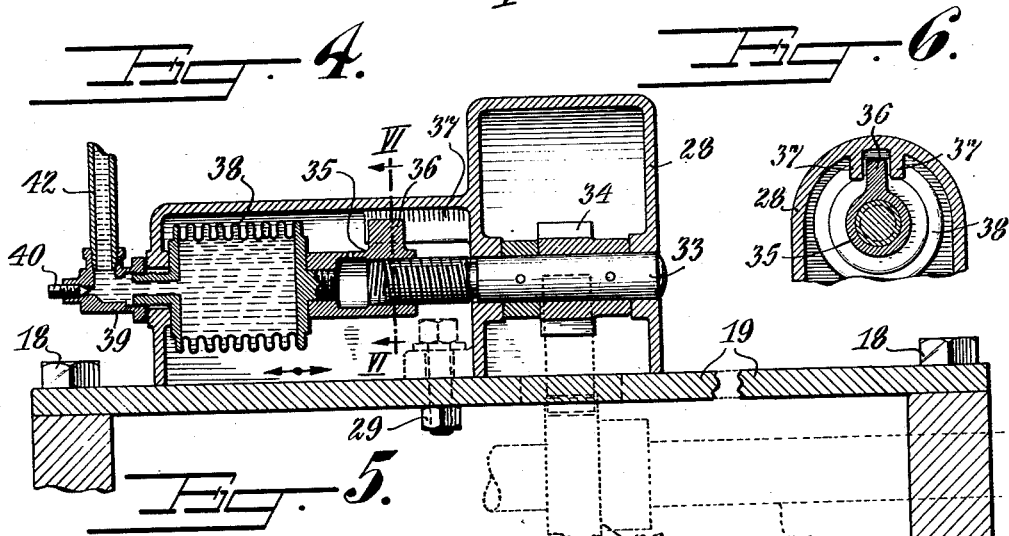
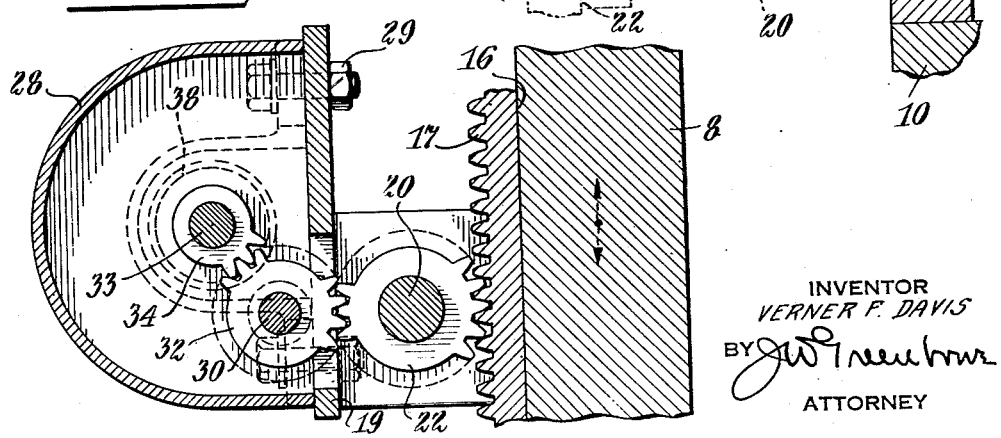
INVENTOR
VERNER F. DAVIS
BY
ATTORNEY March 12, 1940.　　　V. F. DAVIS　　　2,192,963
COMPENSATED VALVE
Filed May 22, 1937　　　4 Sheets-Sheet 3
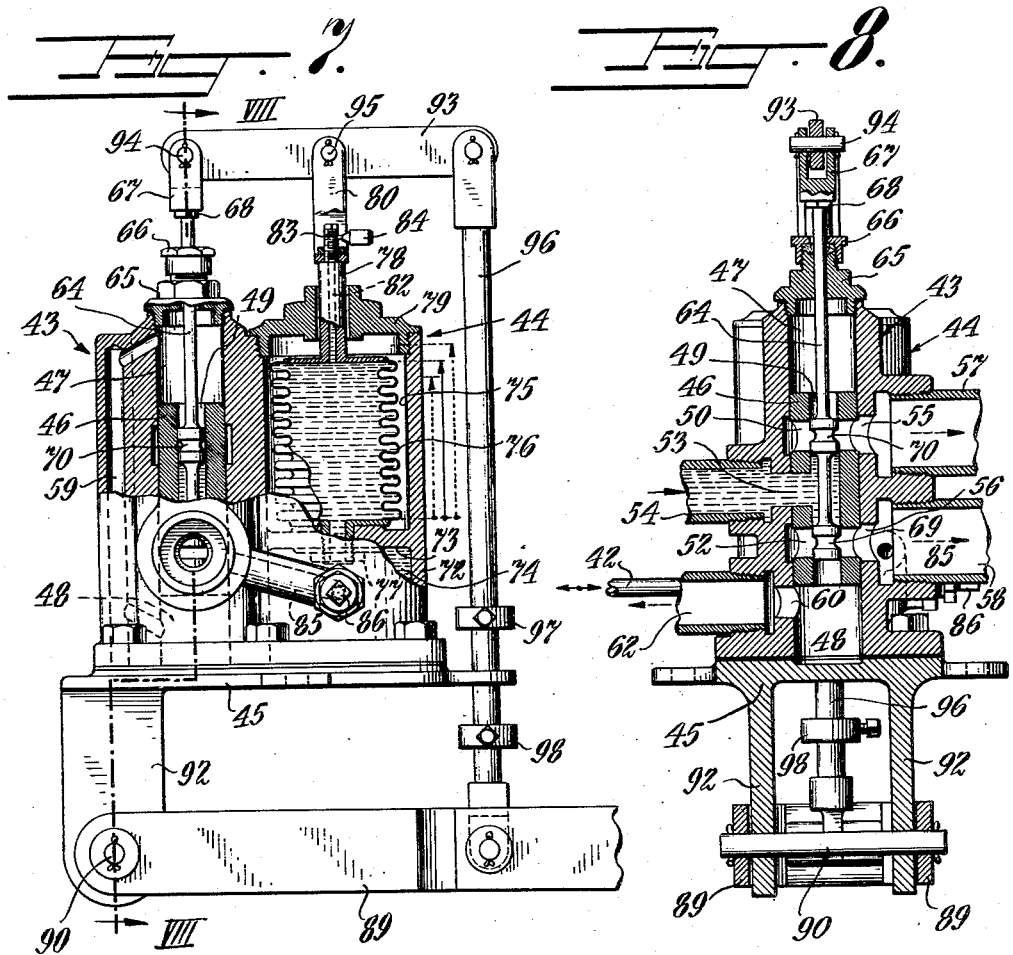
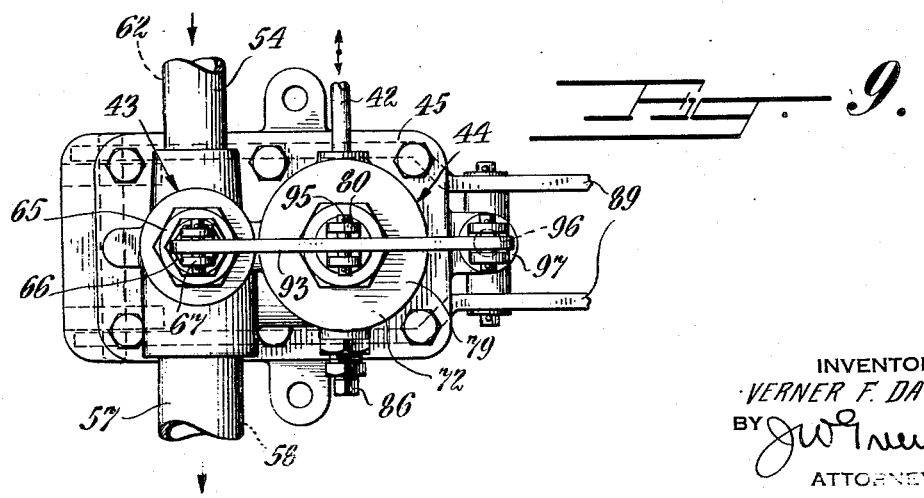
INVENTOR
VERNER F. DAVIS
BY
ATTORNEY March 12, 1940.   V. F. DAVIS   2,192,963
COMPENSATED VALVE
Filed May 22, 1937   4 Sheets-Sheet 4

INVENTOR
VERNER F. DAVIS
BY
ATTORNEY

Patented Mar. 12, 1940

2,192,963

UNITED STATES PATENT OFFICE 2,192,963

COMPENSATED VALVE

Verner F. Davis, West Orange, N. J., assignor to Atlas Valve Company, Newark, N. J., a corporation of New Jersey Application May 22, 1937, Serial No. 144,146

3 Claims. (Cl. 137—68)

My present invention relates to valves and particularly to a type which may be termed a compensating valve.

Various types of valves have long been known to the art, which may be opened to control the flow of fluid. In so far as I am aware, however, it has been exceedingly difficult to so operate the valves that the flow of fluid or pressure may be controlled to a fine degree or within preselected limits without what is termed a "hunting" action of the valve. While a valve constructed in accordance with my present invention is readily adaptable to many purposes, it is of particular utility when employed in connection with maintaining a substantially constant fluid level or volume.

For example, many municipalities have sewerage treating plants for storm drainage and inasmuch as the treating capacity of such plants is more or less limited to a maximum volume, some provision must necessarily be made to restrict the flow of fluid so as to confine it to such capacity as the treating plant can accommodate.

It is the usual practice with most municipal treating plants to provide a reservoir of a preselected capacity from which the fluid flows to the treating plant. Since the rate of flow from this reservoir to the treating plant filters is more or less at a constant rate it is necessary that drainage flow to the reservoir be controlled so that a substantially constant level be maintained. To this end it is customary to provide a sluice gate which is opened and closed for controlling the fluid level in the reservoir so that it may be filled at the same rate as the fluid is drawn off to thus limit the flow to the treating plant.

It is accordingly an object of my present invention to provide a valve which is automatically operable to control the rate of fluid flow.

Another object of my present invention is the provision of a valve automatically operable to maintain a substantially constant fluid level.

Another object of my present invention is the provision of a compensating valve automatically operable to limit fluid flow and which is exceedingly sensitive to changes in fluid level so as to confine the latter to such comparatively small limits as to substantially constitute a constant level.

A further object of my present invention is the provision of a compensating valve operable to control a sluice gate so as to limit fluid flow to a reservoir.

Still further objects of my present invention will become obvious to those skilled in the art by reference to the accompanying drawings wherein:

Fig. 1 is a schematic side view partly in cross-section showing my novel valve in conjunction with a sluice gate for controlling fluid flow;

Fig. 2 is a schematic front view of a sluice gate utilizing a valve constructed in accordance with my present invention;

Fig. 3 is a top plan view of a portion of my valve operating mechanism with portions thereof broken away to better illustrate the device;

Fig. 4 is a side view in cross-section of the portion of the valve operating mechanism taken on line IV—IV of Fig. 3;

Fig. 5 is a cross-sectional view taken on the line V—V of Fig. 3 and looking in the direction indicated by the arrows;

Fig. 6 is a fragmentary cross-sectional view taken on the line VI—VI of Fig. 4 looking in the direction indicated by the arrows;

Fig. 7 is a front elevational view partly in cross-section of a compensating valve constructed in accordance with my present invention;

Fig. 8 is a side elevational view in cross-section of my compensating valve taken on the line VIII—VIII of Fig. 7;

Fig. 9 is a top plan view of my compensating valve as shown in Figs. 7 and 8;

Figure 10:
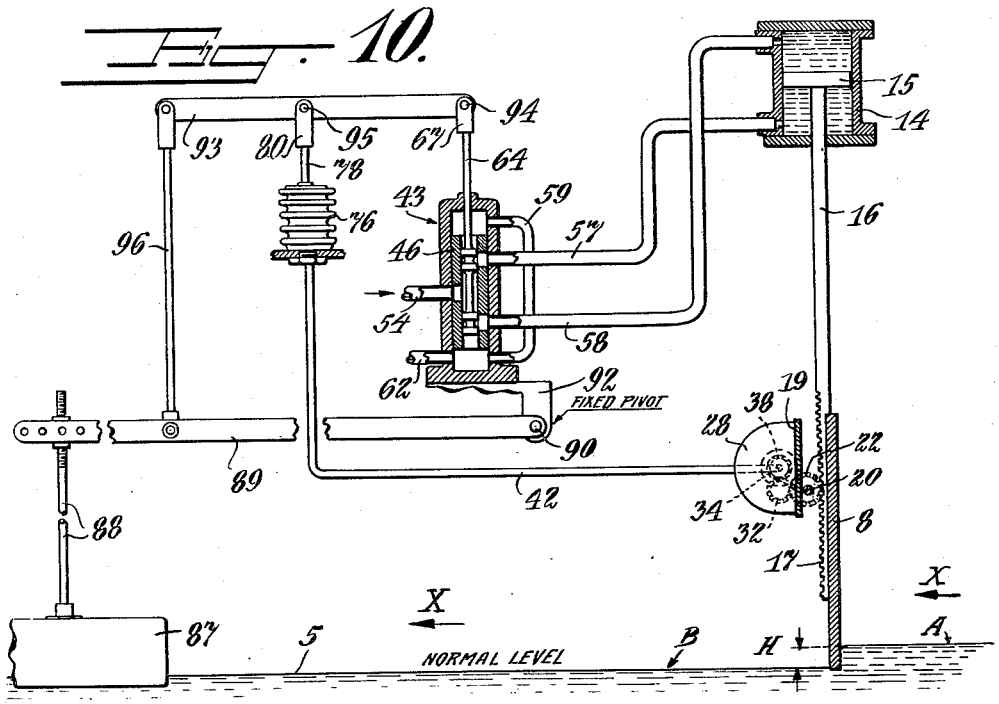
Fig. 10 is a schematic view partly in cross-section showing operation of my compensating valve for controlling a sluice gate to limit fluid flow.
Figure 11:
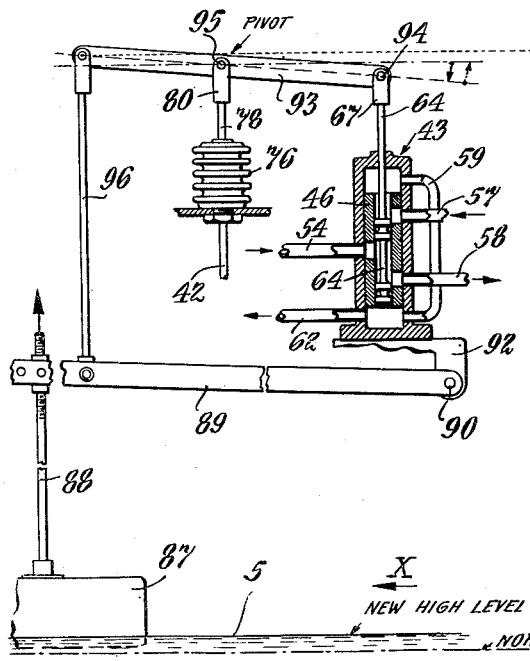
Fig. 11 is a further schematic view partly in cross-section showing the open position of my compensating valve to cause closure of a sluice gate.

Referring now to the drawings in detail I have shown in Fig. 1 a reservoir 5 of the type normally employed with the usual municipal sewerage treatment plants which may be formed of reinforced concrete and provided with a wall 6 and barrier 7. The wall 6 is provided with a sluice gate 8 of suitable metal or the like which does not readily deteriorate. This gate 8 is arranged to slide in slots 9 formed in a metal frame 10, the latter of which is embedded in the concrete wall 6 so as to form a seal therewith. The sluice gate 6 frame is of substantially rectangular configuration and at its upper horizontal portion is of enlarged cross-sectional area, as shown at 12, to form a support for an annular flange or the like 13. Supported by this flange 13 above the reservoir level is a cylinder 14 provided with a piston 15 (Fig. 10) the arm 16 of which extends through a suitable stuffing box or the like to make it fluid tight.

The piston arm 16 passes downwardly through the annular flange 13 and is rigidly secured at one side thereof to the sluice gate 8 while its other side is formed into a rack bar by being provided with teeth 17.

Secured to the gate frame 10 in any suitable manner, such as by bolts 18, is a plate 19 with its major surface spaced from the frame by having its ends disposed at right angles to the frame 10 or by having spacing lugs which thus forms a U-shaped configuration.

A shaft 20 is journaled in the inwardly turned ends of the plate 19 and, at a point coinciding with the teeth 17 of the piston arm 16, is provided with a pinion gear 22 which meshes with the rack bar 17. In order to cause rotation of the shaft 20, with attendant manual raising or lowering of the sluice gate 8 which is rigidly secured to the rack bar 17, it is provided at one end thereof with a bevel gear 23. Engaging this bevel gear is another bevel gear 24 carried by a vertically extending shaft 25 which shaft is journaled in suitable bearings 26 and is provided with a hand wheel 27 disposed above the reservoir level so as to be readily accessible to an operator.

Accordingly, when it is desired to manually raise or lower the sluice gate 8 it is only necessary for the operator to depress the hand wheel 27 thus causing downward movement of the shaft 25 with engagement of the normally disengaged bevel gears 23 and 24. Upon rotation of the hand wheel 27 there will follow rotation of the shafts 25 and 20. Since the pinion gear 22 is rigidly secured to the shaft 20 and this latter gear meshes with the rack bar 17 to which the gate 8 is secured, the gate is caused to move either upwardly or downwardly in the slots 9 depending upon the direction of rotation of the hand wheel 27.

The foregoing description of the construction and manual operation of the sluice gate 8 is well known to the prior art, but since my present invention pertains to a novel valve for automatically operating such a sluice gate, it will be described in connection therewith although, as previously pointed out, it is susceptible to a variety of usages.

For the purpose of automatically operating my compensating valve, as hereinafter more fully described, the plate 19 has a housing 28 secured thereto in a suitable manner such as by bolts 29. By reference more particularly to Figs. 3 to 6, inclusive, it will be noted that a short shaft 30 is suitable journaled therein and rigidly secured to this shaft is a reduction gear 32 which meshes with the pinion gear 22. In addition the housing 28 is provided with an elongated shaft 33 journaled therein which extends from the reduction gear compartment to a further compartment of slightly less diameter.

An additional reduction gear 34 is secured to the shaft 33 in line with the reduction gear 32 so that upon movement of the rack bar 17 there will be rotation not only of the gear 22 but also rotation of the reduction gears 32 and 34. The protruding portion of the elongated shaft 33 is suitably threaded and mounted thereon is a nut 35. In order to prevent rotation of this nut with the shaft 33 it is provided with a lug 36 disposed between a pair of similar lugs 37 forming a rigid part of the housing 28. By this construction the nut 35 is caused to move longitudinally of the shaft 33 in one direction or the other depending upon the direction of rotation of the shaft 33.

Mounted within the housing 28 is a bellows 38 preferably of metal, with one of its ends, which may be termed a diaphragm, rigidly secured to the nut 35. The opposite end of this bellows 38 also constituting a diaphragm, is provided with a threaded extension protruding exteriorly of the housing 28 and is held rigidly in place by a fitting 39. This fitting constitutes substantially an elbow having a passageway extending therethrough which communicates with the interior of the bellows 38 and, in line with the longitudinal axis of the bellows 38, the fitting 39 is provided with a bleeder valve in the form of a set screw or the like 40. A conduit 42 is connected to the fitting 39 which extends to my compensating valve so that the latter is operated in response to contraction and expansion of the bellows 38 as hereinafter more fully described.

The valve proper comprises a pair of cylinders 43 and 44 (see Figs. 7 to 9) mounted exteriorly of the reservoir upon a pair of brackets, which form a hollow pedestal 45. Referring particularly to Figs. 7 and 8 it will be noted that the cylinder 43 is provided with a sleeve 46 snugly fitting the interior thereof but of slightly less length, thus forming chambers 47 and 48 at the top and bottom of the cylinder. A small longitudinal bore 49 is provided in the sleeve 46 which communicates with a pair of transverse bores 50 and 52 as well as the chambers 47 and 48 and, intermediate the transverse bores, the sleeve 46 is provided with an opening 53 which aligns with an opening in the cylinder wall engageable by a conduit 54 extending from a suitable source of fluid supply, such as a compressed air source, the usual municipal water supply, or any other hydraulic pressure source.

A pair of annular passages 55 and 56 are provided in the wall of the cylinder 43 in alignment with the transverse bores 50 and 52 of the sleeve 46 and the annular passageway 55 communicates with a threaded opening engaged by a conduit 57 extending to the bottom of the sluice gate operating piston 15, while the annular passageway 56 likewise communicates with a threaded opening engaged by a similar conduit 58 extending to the top of this same piston.

A passageway 59 (Fig. 7) interconnects the two chambers 47 and 48 and for the purpose of exhausting fluid after operation of the valve, the chamber 48 is provided with a port 60 in alignment with a threaded opening in the cylinder wall engaged by a conduit 62 which may extend to a suitable opening 63 (Fig. 1) so that the fluid is discharged into the reservoir 5.

In order to cause the flow of fluid through the valve, with attendant movement of the sluice gate 8, a piston 64 is disposed within the cylinder 43 and sleeve 46 which extends through suitable packing flanges 65 and 66 and at the upper extremity thereof is threadedly engaged by a bifurcated member 67 held in place by a lock nut 68. The diameter of the valve piston 64 is less than that of the longitudinal bore 49 but at spaced points along its length, equal to the spacing of the transverse bores 50 and 52, the piston 64 is provided with enlarged portions 69 and 70 in the form of spools which snugly fit the longitudinal bore 49 of the sleeve 46. Accordingly when the valve piston 64 is in the neutral position, as shown in Fig. 8, fluid pressure admitted by the conduit 54 and opening 53 is retained in the annular chamber formed between the valve piston 64 and the sleeve 46 by the enlarged portions or spools 69 and 70.

Upon downward movement of the valve piston 64 together with the spools 69 and 70 fluid pressure will be forced through the longitudinal bore 50 and through the transverse bore 52, annular passageway 56 and conduit 58 to the top of the piston 15. This pressure accordingly forces downward movement of the piston 15 and sluice gate 8 to thus restrict the further flow of water into the reservoir. During downward movement of the piston 15 the fluid in the cylinder beneath the piston is forced through conduit 57 and since the upper valve piston spool 70 has opened communication between the transverse bore 50 and upper chamber 47, the fluid flows through the latter, thence by means of passageway 59 to the lower chamber 48 and through exhaust conduit 62 and opening 63, where it is discharged into the reservoir 5.

When the valve piston 64 with its integral spools 69 and 70 is moved upwardly the cycle of operation is merely reversed by communication of the source of hydraulic pressure being established directly with the transverse bore 50, annular passageway 55 and conduit 57, to the bottom of piston 15. The fluid above the latter piston is thus forced through conduit 58, annular passageway 56, transverse bore 52, and longitudinal bore 49 directly into chamber 48 from which it again discharges through exhaust conduit 62 and opening 63 into the reservoir 5. The application of fluid pressure to the underside of the piston 15 thus opens the sluice gate 8 to allow the flow of additional sewerage into the reservoir 5.

In order to automatically cause operation of the valve piston 64, together with the piston 15 and movement of the gate 8, to maintain the volume or capacity of fluid in the reservoir 5 within very narrow preselected limits, I provide a compensating mechanism in conjunction with my valve which operates in response to exceedingly small changes in fluid level without any attendant "hunting" action of the valve. This latter mechanism, in addition to that previously described as contained within the housing 28, comprises a housing 72 mounted upon the pedestal 45 adjacent the cylinder 43 and which may form an integral part of the same casting.

As shown more particularly in Fig. 7 the housing 72 is provided with a partition 73 dividing it into two compartments 74 and 75. The conduit 42, which as before explained threadedly engages the fitting 39 and communicates with the bellows 38 disposed within the housing 28, extends to the compartment 74 and threadedly engages the housing 72, as can be seen more clearly from Fig. 9.

Positioned within the compartment 75 is a bellows 76 similar to the bellows 38 which is provided with a hollow extension protruding through the partition 73 and a lock nut 77 holds the bellows 76 securely in place so that the interior of the latter is in communication with the compartment 74 and also with the bellows 38 by virtue of the conduit 42. The opposite end or diaphragm of the bellows 76 has a portion 78 rigidly secured thereto which extends loosely through the housing cover 79. The extremity of this portion 78 is threaded and supports a bifurcated member 80 similar to that of the member 67 carried by the valve piston 64. A small passageway 82 extends longitudinally of the portion 78 and is closed at its upper end by a set screw or the like 83 having a bleeder or pressure valve 84 secured thereto.

In order to fill what I term my compensating mechanism, comprising the bellows 38 and 76, with fluid the cylinders 43 and 75, which as before stated may be cast en bloc, are provided with a passageway 85 (Fig. 7). This passageway communicates with the source of hydraulic pressure by opening into the annular passage 56 (Fig. 8). It should be noted that the valve piston 64 must be in a predetermined position, or in other words, with the spool 69 downward allowing fluid to flow from the longitudinal bore through the transverse bore before fluid will flow through the passageway 85. The cylinder 75 is also provided with a suitable needle valve or the like 86 (Figs. 7 and 9) which is opened to allow the compensating mechanism to be filled.

Opening of this needle valve after the valve piston 64 has been properly set, thus allows fluid to flow into the chamber 74 from which it flows to both bellows 38 and 76. During the initial filling trapped air may be rapidly released by loosening the set screw 83 or more slowly as the pressure builds up by the bleeder valve 84. Once the compensating mechanism has once been filled it need not be further disturbed unless a leak develops or it is drained by opening the bleeder valve 40 on the fitting 39 adjacent the gate 8.

Operation of the valve piston 64, together with the portion of the compensating mechanism encased in the adjacent housing 75 is effected by the rise and fall of a metallic float 87 (Fig. 1) which is disposed within the reservoir 5. This float is connected by means of a rod or the like 88 to a bar 89, the latter of which is pivoted at 90 to a flange 92 formed on the pedestal 45. A similar bar 93 is pivotally connected at 94 and 95 to the bifurcated members 67 and 80 and the bar 93 is interconnected with the bar 89 by a pivoted link 96 having fixed collars or stops 97 and 98. By this link and bar arrangement the float 87 is thus operably connected to the valve piston 64 and the bellows 76.

The operation of my compensating valve may be explained as follows: At normal operating conditions where the water in the reservoir 5 is consumed or utilized at the treating plant as rapidly as it flows into the reservoir, the gate 8 will remain at its normal position such as shown in Figs. 1, 2 and 10. This will accordingly maintain the valve piston 64 in a neutral position, such as shown in Fig. 10, due to the action of the float and the compensating mechanism. Should the water level "A" (Fig. 10) rise from storm drainage or the like, this would normally cause a similar rise in the reservoir level "B" and upward movement of the float 87 with an increase of volume above that which the treating plant could accommodate.

To prevent the occurrence of such condition and to maintain a substantially constant volume of water within the reservoir 5, the upward movement of the float actuates the compensating valve to cause movement of the gate in the following manner. Upward movement of the float 87 causes movement of the horizontal bar 89 about its fixed pivot 90 which in turn causes upward movement of the horizontal bar 93 by virtue of the pivoted link 96.

At this time the gate 8 will not have left its normal position with the result that the bellows 76 will be expanded and the point 95 functions as the pivot for the rod 93, thus causing downward movement of the valve piston 64. When the valve piston 64 moves downwardly the respective spools 69 and 70 likewise move downwardly allowing the pressure fluid to flow through the transverse bore 52, annular passage 56 and conduit 58 to the top of piston 15. This pressure accordingly forces the piston 15 downwardly and since the gate 8 is rigidly secured thereto it is also moved toward closed position. At this time the fluid on the underside of the piston 15 is forced through the conduit 57 back to the valve and thence to discharge conduit or opening 63 in the manner previously explained.

As the gate moves downwardly the rack bar 17 causes the gear train, comprising the pinion gears 22, 32 and 34, to rotate (the bevel gears 23 and 24 being disengaged) which effects longitudinal movement of the nut 35 along the threaded portion of the shaft 33 in the guide formed by the depending lugs 37. Movement of the nut to the left as shown in Figs. 3 and 4 thus compresses the bellows 38 since one diaphragm thereof is maintained stationary. The fluid thus contained in the bellows 38 is forced through the conduit 42 causing an expansion of the bellows 76. Expansion of the latter accordingly applies an upward force to the bifurcated member 80 which carries with it the horizontal bar 93.

Figure 12:
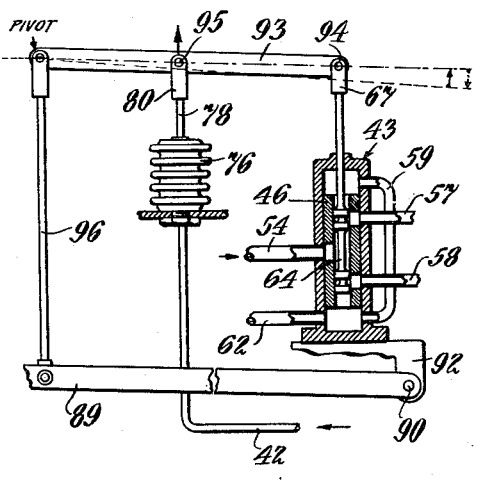
Fig. 12 is a still further schematic view partly in cross-section showing my compensating valve in a closed position.

Since the point 95 at this time no longer functions as a fixed pivot, the pivot point for the bar 93 now shifts to the point where the link 96 is connected thereto, as shown in Fig. 12, inasmuch as such point remains fixed, due to the action of the float 87 and lower horizontal bar 89. The valve piston 64 will then move upwards gradually shutting off the flow of pressure fluid to the top of piston 15 until the valve piston again reaches its neutral position as shown in Figs. 8, 10 and 12. If there is no further change in the water level within the reservoir 5 the entire mechanism, including the gate 8, comes to rest until a new change in level occurs.

Moreover, since my compensating mechanism causes a gradual closing and opening of the valve 64 even prior to an actual reciprocal change in fluid level, there results not only a fine degree of control of the fluid level within the reservoir, but also a complete elimination of undesired reciprocation of the valve 64 and piston 15 which is commonly known to the art as "hunting" inasmuch as both the valve and piston gradually come to rest without oscillation.

Should the water level within the reservoir 5 fall, the gate is then opened to allow more water to flow therein. When the float 87 moves downwardly a small force is again applied through the bar 89 to the small horizontal bar 93. Since the bellows 76 is at this time expanded the point 95 functions as a fixed pivot for the movement causing a raising of the valve piston 64. Pressure fluid is accordingly forced through the conduit 57 to the underside of the gate piston 15 with the fluid above the piston being forced through the valve to discharge passage 63 in the manner previously explained. Such force on the piston 15 accordingly raises the gate 8 with opposite rotation of the respective reduction gearing 22, 23, and 34 accompanied by expansion of the bellows 38. This relieves the pressure on the bellows 76 with attendant lowering of the pivot 95 and the valve piston 64, since the pivotal connection between the link 96 and bar 93 now functions as the pivot. The valve piston 64 is thus gradually lowered until it again comes to rest in its neutral position.

It thus becomes obvious to those skilled in the art that I have provided a compensating valve for the operation of a hydraulic piston which is exceedingly sensitive in its operation. Due to the immediate response of my compensating valve to changes in fluid level, it is particularly adaptable to applications where it is desired to maintain a substantially constant fluid level, such as in conjunction with municipal treating plants or the like, where a sluice gate is utilized. Moreover, by changing the ratio of the reduction gearing forming a part of my mechanism the upper and lower limits of water level within a reservoir or receptacle can be varied within comparatively wide limits ranging from an inch or so to a foot or more without in any way impairing the responsiveness of the mechanism to fluid level changes.

Although I have shown and described one specific embodiment of my present invention, I do not desire to be limited thereto as various other modifications thereof may be made without departing from the spirit and scope of the appended claims.

What is claimed is:

1. The combination with a fluid motor including a piston, a reservoir having an inlet for liquid flow, a member extending from said piston, a gate for said inlet connected to said member, a compensating valve, a piston arm extending from said valve, a fluid pressure supply for said valve, a float in said reservoir, a conduit leading from said valve for the passage of pressure fluid to one side of said piston, a conduit leading from the other side of said piston to said valve for the removal of pressure fluid to cause a movement of said piston, a hydraulic expansible and contractible element, a link having one end pivoted to an end of said piston arm, a connector member extending from said float and pivotally attached to the other end of said link, a fulcrum member extending from said element serving as a fulcrum to cause said link upon an upward movement of said float to actuate said piston arm causing a flow of liquid above said piston to lower said gate, a hydraulic bellows, a liquid conduit connecting said bellows and said element, said bellows having one end fixed and the other end free to move, a member movable when rotated to move said free end of said bellows, a gear on said last mentioned member, a rack on said gate and reduction gearing operable upon a movement of said rack to move said movable member to compress said bellows causing said liquid to expand said element and lift said link to operate said valve.

2. The combination with a fluid motor including a piston, a reservoir having an inlet for liquid flow, a member extending from said piston, a gate for said inlet connected to said member, a compensating valve, a piston arm extending from said valve, a fluid pressure supply for said valve, a float in said reservoir, a conduit leading from said valve for the passage of pressure fluid to one side of said piston, a conduit leading from the other side of said piston to said valve for the removal of pressure fluid to cause a movement of said piston, a hydraulic expansible and contractible element, a link having one end pivoted to an end of said piston arm, a connector member extending from said float and pivotally attached to the other end of said link, a fulcrum member extending from said element serving as a fulcrum to cause said link upon an upward movement of said float to actuate said piston arm causing a flow of liquid above said piston to lower said gate, a hydraulic bellows, a liquid conduit connecting said bellows and said element and means operably connecting said gate to said bellows comprising reduction gearing connected to said bellows and rotatable by movement of said gate to cause contraction of said bellows and expansion of said element with attendant raising of said link and reverse movement of said piston arm, in response to relatively small movement of said gate.

3. The combination with a fluid motor including a piston, a reservoir having an inlet for liquid flow, a member extending from said piston, a gate for said inlet connected to said member, a compensating valve, a piston arm extending from said valve, a fluid pressure supply for said valve, a float in said reservoir, a conduit leading from said valve for the passage of pressure fluid to one side of said piston, a conduit leading from the other side of said piston to said valve for the removal of pressure fluid to cause a movement of said piston, a hydraulic expansible and contractible element, a link having one end pivoted to an end of said piston arm, a connector member extending from said float and pivotally attached to the other end of said link, a fulcrum member extending from said element serving as a fulcrum to cause said link upon an upward movement of said float to actuate said piston arm causing a flow of liquid above said piston to lower said gate, a hydraulic bellows, a liquid conduit connecting said bellows and said element, means for holding one end of said bellows, a threaded shaft, a nut integral with the other end of said bellows, a gear in said shaft, a rack on said gate and reduction gearing between said rack and said gear for causing relatively slight movement of said nut to compress said bellows during a relatively long movement of said gate.

VERNER F. DAVIS.